(12) United States Patent
Gasser et al.

(10) Patent No.: US 9,328,515 B2
(45) Date of Patent: May 3, 2016

(54) DEVICE FOR BONDING OR WELDING A MEMBRANE

(71) Applicant: SFS intec Holding AG, Heerbrugg (CH)

(72) Inventors: Daniel Gasser, Diepoldsau (CH); Sven Sieber, Diepoldsau (CH); Sonja Oesch, Oberriet SG (CH)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 14/366,955

(22) PCT Filed: Feb. 6, 2013

(86) PCT No.: PCT/EP2013/052257
§ 371 (c)(1),
(2) Date: Jun. 19, 2014

(87) PCT Pub. No.: WO2013/124148
PCT Pub. Date: Aug. 29, 2013

(65) Prior Publication Data
US 2014/0345806 A1 Nov. 27, 2014

(30) Foreign Application Priority Data
Feb. 21, 2012 (DE) .......................... 10 2012 101 380

(51) Int. Cl.
*B32B 37/00* (2006.01)
*E04D 15/04* (2006.01)
(Continued)

(52) U.S. Cl.
CPC ................ *E04D 15/04* (2013.01); *B29C 65/46* (2013.01); *B29C 65/4815* (2013.01);
(Continued)

(58) Field of Classification Search
CPC .. B29C 65/46; B29C 65/4815; B29C 66/474; B29C 66/8652; E04D 5/149; E04D 15/04; E04D 15/06; E04D 15/07
USPC ............. 156/71, 379.6, 380.2, 391, 499, 574, 156/577, 579, 583.1
See application file for complete search history.

(56) References Cited

U.S. PATENT DOCUMENTS 4,548,016 A 10/1985 Dubich et al.
4,869,044 A * 9/1989 Wald .......................... 52/746.11
(Continued)

FOREIGN PATENT DOCUMENTS

DE 60300533 2/2006
JP 05315064 11/1993
(Continued)

*Primary Examiner* — James Sells
(74) *Attorney, Agent, or Firm* — Volpe and Koenig, P.C.

(57) ABSTRACT

A device (20) for bonding or welding a membrane, including an undercarriage (30) for supporting the device on the membrane at least at one contact point, which is formed by a pressing element (40) for pressing the membrane onto a metal plate to be bonded or welded thereto, and at least at two further contact points, which are formed by castors (31, 32). A frame (42) extends upwards from the undercarriage (30), wherein the device (20) can be manoeuvred using the frame. The pressing element (40) includes a heating device (46), which is designed as an induction coil, by which the metal plate, which is provided with an adhesive or weldable coating, can be heated. An induction generator and a control and cooling device thereof are mounted in or on a housing (50), which is fixed to the frame (42) at a distance (A) above the undercarriage (30). The device (20), which is formed as one part, can be tilted for moving around a castor axis (28) and can then be lowered via the metal plate onto the membrane.

17 Claims, 6 Drawing Sheets

(51) Int. Cl.
  *B29C 65/46* (2006.01)
  *B29C 65/48* (2006.01)
  *B29C 65/50* (2006.01)
  *B29C 65/00* (2006.01)
  *E04D 5/14* (2006.01)
  *H05B 6/10* (2006.01)
  *H05B 6/14* (2006.01)
  *B29L 31/10* (2006.01)

(52) U.S. Cl.
  CPC ........ *B29C 65/5057* (2013.01); *B29C 66/1122* (2013.01); *B29C 66/474* (2013.01); *B29C 66/742* (2013.01); *B29C 66/836* (2013.01); *B29C 66/8652* (2013.01); *B29C 66/872* (2013.01); *E04D 5/147* (2013.01); *E04D 5/149* (2013.01); *H05B 6/105* (2013.01); *H05B 6/14* (2013.01); *B29C 66/8161* (2013.01); *B29C 66/81811* (2013.01); *B29L 2031/108* (2013.01)

(56) References Cited

U.S. PATENT DOCUMENTS

| | | | |
|---|---|---|---|
| 4,978,825 | A | 12/1990 | Schmidt et al. |
| 5,110,398 | A | 5/1992 | Murphy |
| 5,526,624 | A | 6/1996 | Berg |
| 5,624,511 | A | 4/1997 | Lippman |
| 6,229,127 | B1 | 5/2001 | Link |
| 6,537,402 | B2 * | 3/2003 | Pate et al. ................ 156/71 |
| 7,399,949 | B2 | 7/2008 | Barber et al. |
| 8,080,117 | B1 | 12/2011 | Lasko |
| 2005/0103437 | A1 | 5/2005 | Carroll |
| 2009/0321423 | A1 | 12/2009 | Challita et al. |

FOREIGN PATENT DOCUMENTS

| | | |
|---|---|---|
| JP | 06111924 | 4/1994 |
| WO | 9318247 | 9/1993 |

* cited by examiner

DEVICE FOR BONDING OR WELDING A MEMBRANE

BACKGROUND

The invention relates to a device for adhesively bonding or welding a roofing membrane, in particular on a flat roof, with an undercarriage for supporting the device on the roofing membrane at a contact point which is formed by a pressing element for pressing the roofing membrane onto a component to be adhesively bonded or to be welded thereto, and at least one further contact point and/or a contact line which is and/or are formed by a castor or roller for moving the device, with a controllable electric heating device with which the roofing membrane and at least the component can be brought into an adhesively bondable or weldable state, and with a frame which extends upward from the undercarriage and with which the device can be maneuvered.

Such a device is known from the document U.S. Pat. No. 5,624,511 A. The known device serves for welding overlapping edge sections of weldable materials, such as, for example, roof sheets. The device has a frame to which an electric heating element is fastened in such a manner that said heating element can be positioned between the mutually overlapping edges of two sheets in order to heat the two and thus to bring said sheets into a weldable state. An alignment control mechanism presses the overlapping sheet into a desired alignment relative to the overlapped sheet. A pressing roll serves to press together the heated sheet sections in order to weld the latter to each other. In this case, the roofing membrane to be welded is a sheet and the component to which said sheet is to be welded is likewise a sheet. The known device is not suitable for welding a roofing membrane to a component which is a plate arranged somewhere below the roofing membrane, but not at the edge of same. This is because the heating element can only be introduced at the edge of the roofing membrane between the latter and a component which is to be welded to said roofing membrane. However, nowadays, roofing membranes are adhesively bonded or welded over large areas to roofs with plates which are arranged below the entire roofing membrane in a preferably regular grid and are fixedly connected to a substructure. The majority of such plates would therefore be inaccessible to an electric heating element as used in the known device.

Plates of the abovementioned type are known, for example, from the document U.S. Pat. No. 6,640,511 B1. Such plates are provided on their upper side with a coating which, by heating of the plate, can be set into an adhesively bondable or weldable state in order to be able to weld a roofing membrane to the plate.

In order to weld roofing membranes to such plates, there are welding devices which operate with induction in the prior art. These customarily involve stationary devices which are placed onto the roofing membrane over the presumed position of the plate. With the aid of an induction coil, the plate is heated in order thereby to set a coating of the plate into an adhesively bondable or weldable state in which the plate can be adhesively bonded or can be welded to the roofing membrane or roof sheet located thereabove. A device of this type is known from US 2009/0321423 A1. The handling of this device is associated with great effort because the entire device has to be raised in each case and set down again from plate to plate. In this device, the induction coil heats up to a very great extent during operation. The removal of heat from the induction coil is therefore a problem in this device. In this device, not only the housing in which the electric control device for the induction coil is accommodated, but also a base in which the induction coil is accommodated therefore have to be provided with special heat sinks for effective removal of heat.

The document U.S. Pat. No. 7,399,949 B2 discloses a further device of the abovementioned type which has to be carried from plate to plate and in which a high outlay for removing heat is likewise required.

In order to solve the problem of the great effort needed for handling of the device, devices which are of two-part design have already been developed. In such devices, use is made of a separate induction head which is connected via a cable to a control unit which is accommodated in a separate housing which can be movable. Such a device is known by way of example from the document U.S. Pat. No. 6,229,127 B1. A disadvantage in the case of the devices with a separate induction head is that the operator handling the induction head has to work on their knees.

Finally, in order to improve the efficiency of such devices with a separate induction head, a circuit has already been developed, which circuit with the aid of a special exploring coil or else with the aid of the induction coil itself makes it possible electrically to determine the precise position of the plates under a roofing membrane so that the induction head can be placed centrally onto each plate before the adhesive bonding or welding operation is initiated. Devices with a separate induction head, in which first of all the precise position of the plate relative to the induction coil is determined before the welding, are known, for example, from the documents JP 5-315064 A and JP 6-111924 A.

In the case of the known roofing membrane induction welding devices, after each adhesive bonding or welding operation, as soon as the welding device or the induction head has been moved away from the plate which has just been heated, a magnet fastened to a separate rod is customarily placed onto the plate and is left there until the adhesive bonding or welding point has cooled.

SUMMARY

It is the object of the invention to design a single-part device of the type mentioned at the beginning in such a manner that it can be handled more easily and safely during use and supplies better adhesive bonding or welding results with substantially less outlay, in particular also in respect of removal of heat.

This object is achieved according to the invention on the basis of a device of the type mentioned at the outset in that the pressing element comprises the heating device which is designed as an induction coil and with which a metal plate which forms the component and is provided with an adhesively bondable or weldable coating can be heated, in that an induction generator and a control and cooling device of same are fitted in or on a housing which is fitted on the frame at a distance above the undercarriage, and in that the device can be tilted with the frame about a castor and/or roller axis.

There are indeed already devices for adhesively bonding or welding a roofing membrane, as the document U.S. Pat. No. 5,624,511 A also indicates, from which a device of the type mentioned at the beginning is known, but all of the previously known devices of this type operate with a heating device which is designed as an electric heating element (U.S. Pat. No. 5,624,511 A), as a hot air fan (U.S. Pat. No. 5,110,398 A) or the like. The applicant notes that mobile heating apparatuses which operate with inductive heating have previously been used only either as single-part stationary devices (US 2009/0321423 A1 or U.S. Pat. No. 7,399,949 B2) or as two-part devices with a welding head which is arduous to handle (U.S. Pat. No. 6,229,127 B1 or JP 5-315064 A). Accordingly, the device according to the invention, which is movable in a tilted state and is lowered over the plate by the pressing element, can be handled much more simply and with much less effort although it is a single-part device. This device is therefore advantageously usable in a field fastening system for flat roofs where hundreds or thousands of plates are to be adhesively bonded or welded to a roofing membrane. The device according to the invention can easily be steered, can be used on inclined planes or roofs, can be stopped reliably without the risk of rolling away and cannot be tipped over due to an external action, such as, for example, gusts of wind. Although, in the case of the device according to the invention, the induction generator together with the control and cooling device thereof is fitted on the frame in a housing above the undercarriage, in combination with an undercarriage covering a large area in top view, the center of gravity is nevertheless positioned at a sufficiently low level so as to prevent the device from tipping over on a sloping underlying surface or due to external actions, such as gusts of wind.

Advantageous refinements of the device according to the invention form the subject matter of the dependent claims.

In one refinement of the device according to the invention, the pressing element is movable one-dimensionally or multi-dimensionally in relation to the undercarriage by a joint head. As a result, the adaptation of the pressing element, i.e. the parallelism thereof with respect to the surface of the roofing membrane, is facilitated and improved.

In a further refinement of the device according to the invention, the pressing element is provided with compensation elements which ensure that the pressing element rests uniformly on the roofing membrane.

In a further refinement of the device according to the invention, the pressing element can be brought into contact with the roofing membrane in a spring-mounted manner. For this purpose, a helical spring can be used between the pressing element and the undercarriage. A helical spring namely enables height to be compensated for and the application of a vertical pressure onto the roofing membrane and furthermore onto the component from the pressing element. In this case, a combination of a ball joint and a helical spring would be extremely helpful. The parallelism and also the pressing would be even better ensured by such a combination.

In a further refinement of the device according to the invention, the pressing element can be lowered onto the roofing membrane with the undercarriage. This lowering arises when a device which is tilted for moving is lowered again with the pressing element onto the roofing membrane. The device then exerts the necessary force onto the roofing membrane and the component via the pressing element.

In a further refinement of the device according to the invention, at least one of the contact points is designed as a sliding point and the pressing element is also designed to be lowerable onto the roofing membrane from the undercarriage. In this refinement, the device can easily be displaced on the roofing membrane. When the correct position, which has previously been determined and marked on the roofing membrane, is reached, the pressing element can be lowered onto the roofing membrane from the undercarriage by means of a telescope or by means of a mechanical lever structure.

In a further refinement of the device according to the invention, the undercarriage in top view forms a triangle, in the corners of which two castors and the pressing element are arranged. This results in a three-point support of the device on the roofing membrane, said support ensuring that the roofing membrane is pressed onto the component by the pressing element and that the roofing membrane makes contact with the component.

In a further refinement of the device according to the invention, the undercarriage in top view forms a triangle, in the corners of which two castors and the sliding point are arranged. A three-point support with the advantages associated therewith is also present here, but the device can additionally be easily displaced, i.e. does not need to be tilted when the correct position of the pressing element relative to the component located under the roofing membrane is sought.

In a further refinement of the device according to the invention, the undercarriage in top view forms a square, in the corners of which two castors and two sliding points are arranged. In this refinement, the device covers a larger area, which improves the tilt resistance.

In a further refinement of the device according to the invention, the pressing element is fitted on the undercarriage at a location within the triangle. This makes it possible to hold the pressing element in a position raised from the travel path for as long as the device is moved over the roofing membrane in a non-tilted state.

In a further refinement of the device of the invention, the pressing element is fitted on the undercarriage at a location outside the triangle. This permits a design of an extension arm structure, which carries the pressing element, which is substantially independent of the design of the undercarriage.

In a further refinement of the device according to the invention, the pressing element is fitted on the undercarriage at a location within the square. This refinement essentially affords the same advantages and possibilities as the abovementioned refinement, in which the pressing element is fitted on the undercarriage at a location within the triangle.

In a further refinement of the device according to the invention, the undercarriage is designed as an extension arm which can be pivoted at one end with the frame about the castor and/or roller axis and bears the pressing element at its free, other end. In this refinement, the device has an undercarriage having a very simple construction, in which the extension arm needs little space and room, and therefore the working options on use of this device at locations which are inaccessible or are scarcely accessible in respect of the component are substantially better for an undercarriage which is triangular or square in top view.

In a further refinement of the device according to the invention, the castor and/or roller axis bears at least one castor and/or at least one roller. Depending on the circumstances of the underlying surface below the roofing membrane and on the working surface on the roofing membrane, the work can optionally be carried out with a spot contact and/or line contact between the device and the roofing membrane.

In a further refinement of the device according to the invention, the or each sliding point is designed as a supporting plate. This enables the device to be supported over a large surface area on the roofing membrane at least at the or each sliding point.

In a further refinement of the device according to the invention, the lower side of the supporting plate is provided with elevations for spot-like contact in each case with a roofing membrane. In this refinement of the device according to the invention, unevenness of the roofing membrane or, if required, extensive contact with a roofing membrane can be avoided.

In a further refinement of the device according to the invention, the induction coil is combined with a position exploring coil. The device operator will customarily feel for the position of the plates under the roofing membrane with his foot and mark said position. In cases in which this is not possible, a position exploring coil is helpful. In a simplified combination of this type, the induction coil can be used at the same time as a position exploring coil.

BRIEF DESCRIPTION OF THE DRAWINGS

Exemplary embodiments of the invention are described in more detail below with reference to the drawings, in which.

DETAILED DESCRIPTION OF THE PREFERRED EMBODIMENTS

Figures 12, 13:
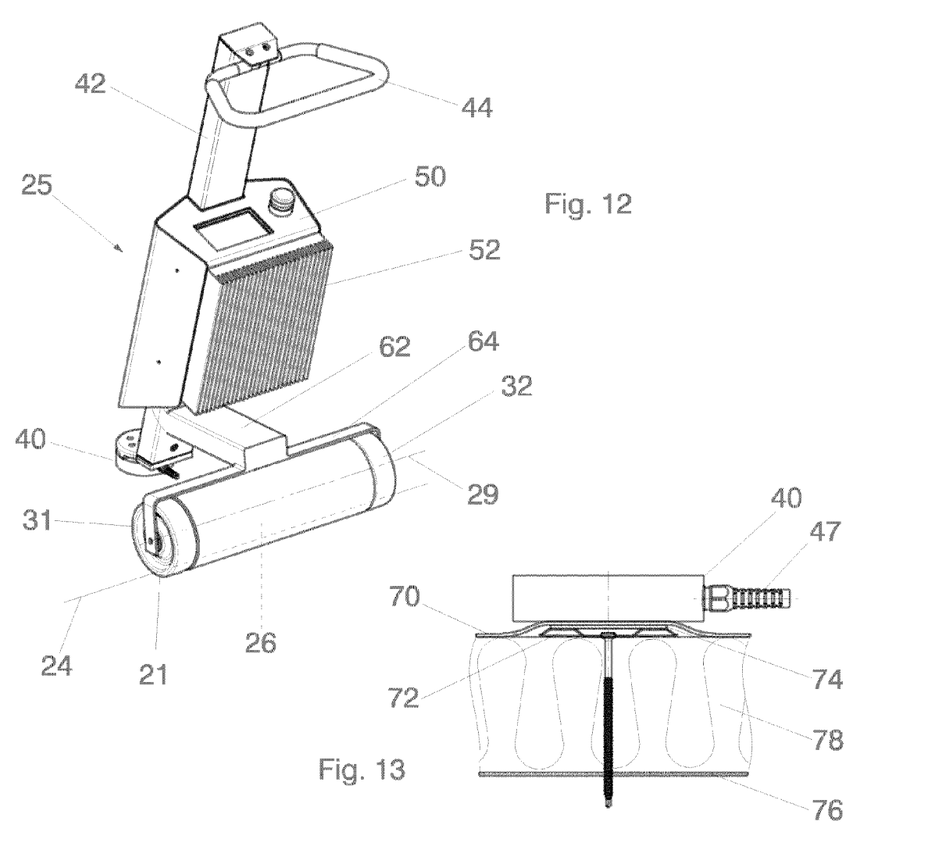
FIG. 12 shows, in a schematic illustration, a further preferred embodiment of the device according to the invention, in which the undercarriage is designed as an extension arm which can be tilted at one end with the frame about a castor and/or roller axis and bears the pressing element at its free, other end.
FIG. 13 shows, in a schematic sectional illustration, the use of a pressing element of the device according to the invention during the welding of a roofing membrane to a metallic plate fastened to a roof substructure.

A preferred embodiment of a device according to the invention for the adhesive bonding or welding of a roofing membrane, in particular on a flat roof, is shown in a front view, in a top view, in a side view and in a perspective illustration in FIGS. 1-4 and is denoted overall by 20. The device 20 has an undercarriage, which is denoted overall by 30, for supporting the device 20 on the roofing membrane (FIG. 13) at a plurality of contact points 21, 22, 23 and/or at a contact line 24 (FIG. 12). In the device 70 according to FIGS. 1-4, the contact points 21, 22 are formed by castors 31 and 32, respectively. The contact point 23 is formed by a pressing element 40 for pressing the roofing membrane onto a component which is arranged therebelow and is to be adhesively bonded or welded thereto (FIG. 13). The component to be welded can be a plate which is provided with an adhesively bondable or weldable coating and is fastened by way of example to the substructure of a flat roof. The term "contact point" used here should not be taken literally, since the castors 31, 32 form short contact lines rather than contact points. In comparison to the length of the contact line 24, which is formed by a roller 26, the castors 31, 32 as a first approximation, however, each form a contact point. The roller 26 can be provided by itself or in addition to castors which are arranged on a same axis 29.

In the case of the device 20 according to FIGS. 1-4, the undercarriage 30 is formed of a triangular frame with two frame limbs 30a, 30b and the axis 28. The frame limbs 30a, 30b and the axis 28 are connected fixedly to one another to form a rigid triangular frame. A crosspiece 34 extends between a frame corner and the center of the axis 28. The crosspiece 34 bears a triggering pedal 36 with which an electric switch (not visible) can be actuated. The castors 31 and 32 are mounted rotatably at the outer ends of the axis 28. The contact point 23 formed by the pressing element 40 forms an additional support point for the undercarriage 30 on the roofing membrane or in general on a working surface. From that corner of the triangular frame of the undercarriage 30 which is assigned to the pressing element 40, a post-like frame 42, with which the device 20 can be maneuvered, extends upward. A handle 44 is fastened pivotably to an upper end of the frame 42 in FIGS. 3 and 4. The handle 44 can thus be adjusted to the height of an operator. The device 20 can be tilted with the frame 42 about the axis 28.

The pressing element 40 comprises a controllable electric heating device with which the roofing membrane 70 and the component 72, or at least the component 72 and not the roofing membrane 70, can be brought into an adhesively bondable or weldable state. Roofing membranes include sheets, for example made from EPDM, which cannot be set into a weldable state by heating. Such a sheet is adhesively bonded to the component 72 which, in the context described here, consists of a plate with a coating 74 which can be set into an adhesively bondable state by heating of the plate.

The heating device 46 is designed as an induction coil. The heating device 46 is connected to the lower end of the frame 42 via an aluminum plate 48. The arrangement here is made in such a manner that, when the device 20 takes up the position shown in FIG. 3, the castors 31, 32, touch the working surface at the contact points 21, 22 and the heating device 46 touches the working surface over the entire area and forms the contact point 23.

An induction generator (not illustrated) and a control and cooling device thereof (not illustrated) are accommodated in or on a housing 50 which is fitted on the frame 42 at a distance A above the undercarriage 30. The rear side of the housing 50 is provided with cooling ribs 52. In the embodiment of the device 20 according to FIGS. 1-4, the pressing element 40 can be lowered onto the roofing membrane with the undercarriage 30. However, the device 20 can also be designed in such a manner that the pressing element 40 can be lowered onto the roofing membrane from the undercarriage 30. In addition, the pressing element 40 can be provided with compensation elements (not illustrated) which ensure that the pressing element 40 rests uniformly on the roofing membrane. These variants are discussed in more detail below.

Figure 1:
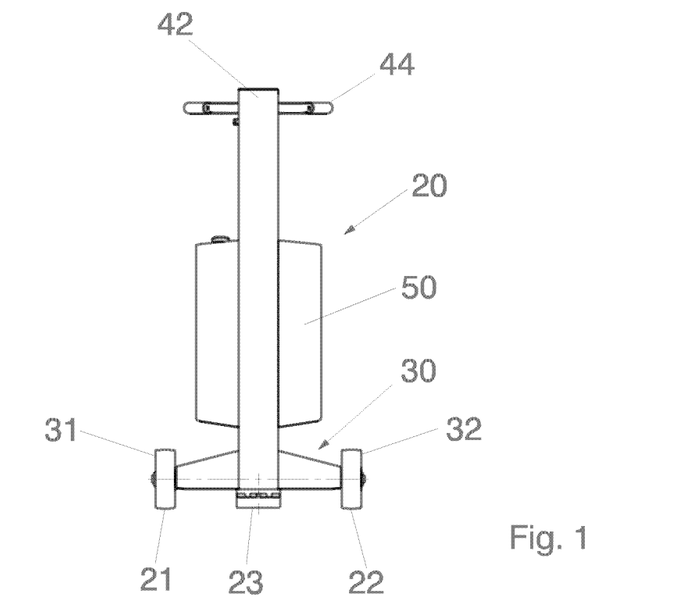
FIG. 1 shows a preferred embodiment of the device according to the invention in a front view.
Figure 2:
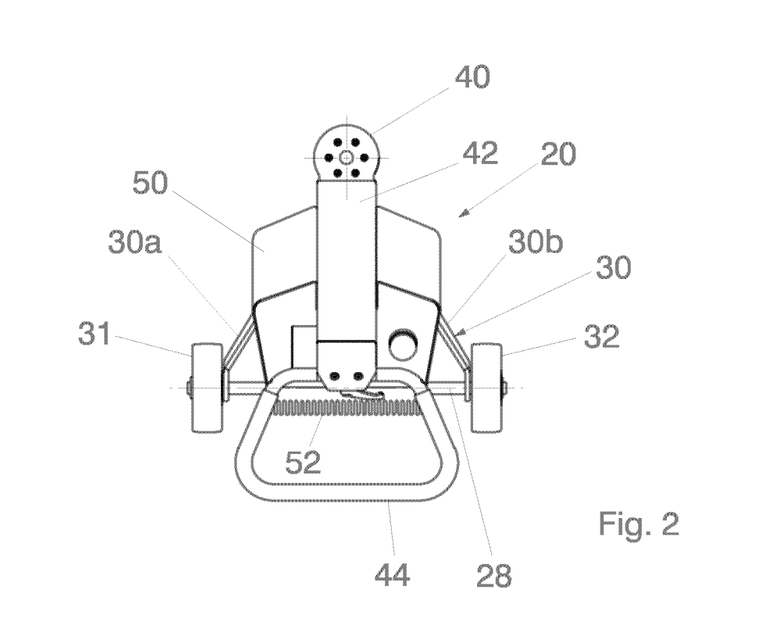
FIG. 2 shows the preferred embodiment of the device according to the invention in a top view.
Figure 3:
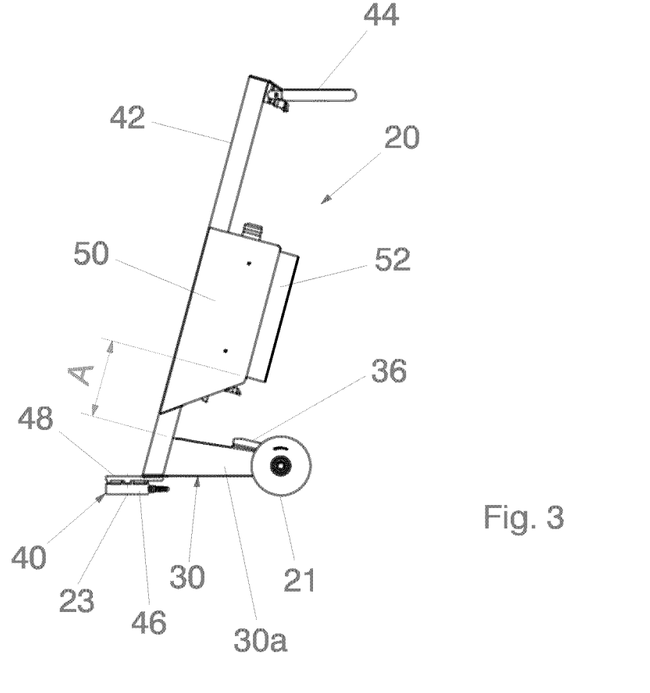
FIG. 3 shows the preferred embodiment of the device according to the invention in a side view.
Figure 4:
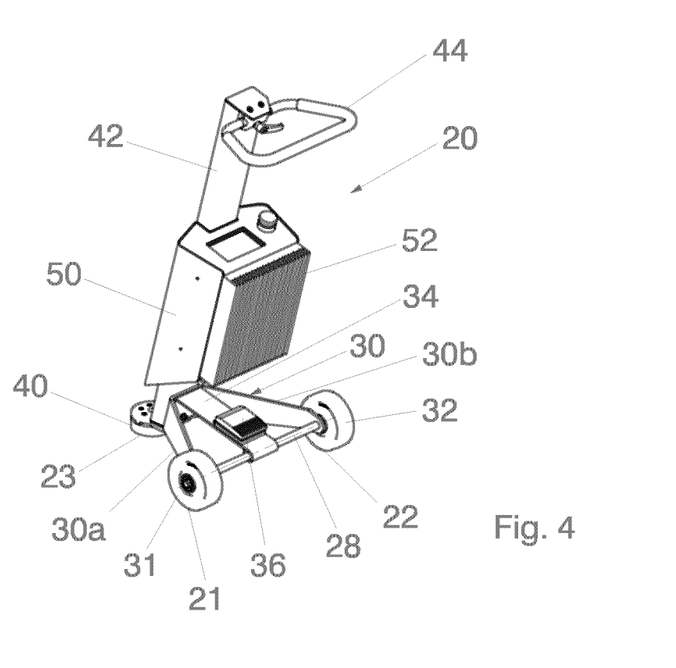
FIG. 4 shows the preferred embodiment of the device according to the invention in a perspective illustration.
Figure 5:
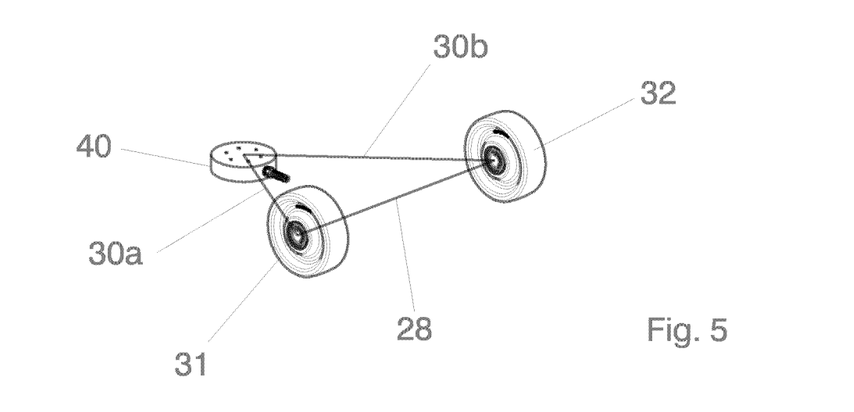
FIG. 5 shows, in a schematic illustration, an undercarriage which in top view forms a triangle, in the corners of which two castors and a pressing element are fitted.

FIG. 5 shows, as a detail in a schematic illustration, the undercarriage 30 of the device according to FIGS. 1-4, which in top view forms a triangle, in the corners of which the two castors 21, 22 and the pressing element 40 are fitted.

Figure 6:
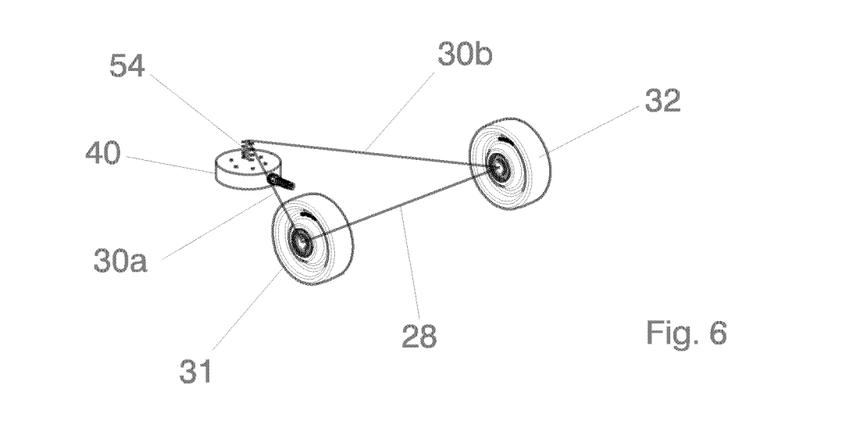
FIG. 6 shows a first variant of the fitting of the pressing element on the undercarriage according to FIG. 5.

FIG. 6 shows a first variant of the fitting of the pressing element 40 on the undercarriage 30 according to FIG. 5. The pressing element 40 is movable one-dimensionally or multi-dimensionally in relation to the undercarriage 30 by a joint head. The joint head is illustrated symbolically as a helical spring 54. The joint head is designed in practice as a ball joint or universal joint.

Figure 7:
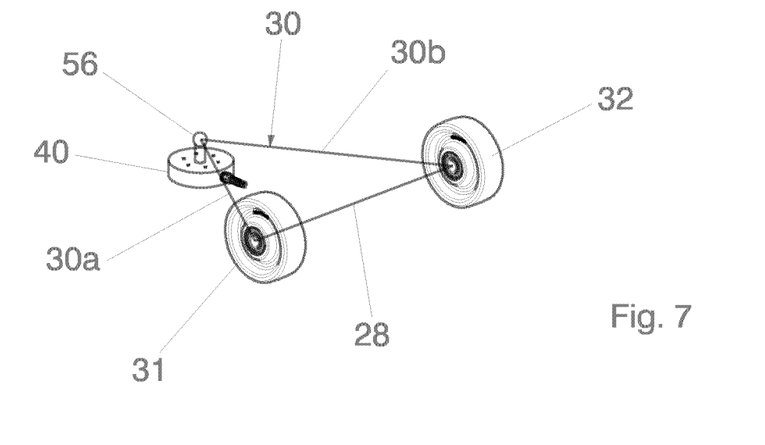
FIG. 7 shows a second variant of the fitting of the pressing element on the undercarriage according to FIG. 5.

FIG. 7 shows a second variant of the fitting of the pressing element 40 on the undercarriage 30 according to FIG. 5. The joint head here is designed as a ball joint 56.

Figure 8:
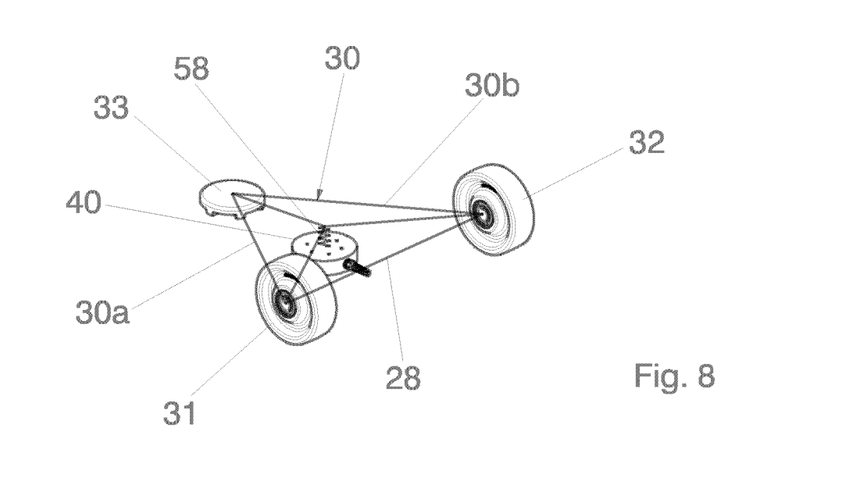
FIG. 8 shows, in a schematic illustration, an undercarriage which in top view forms a triangle, in the corners of which two castors and a sliding point are arranged, wherein the pressing element is fitted on the undercarriage at a location within the triangle.

FIG. 8 shows, in a schematic illustration, the undercarriage 30 which in top view forms a triangle, in the corners of which the two castors 31, 32 and a sliding point 33 are arranged. The pressing element 40 is fitted on the undercarriage 30 at a location within the triangle, as illustrated schematically in FIG. 8. The fitting point of the pressing element 40 is expediently located in the area center of gravity of the triangle. The pressing element 40 can be lowered from the fitting point thereof on the undercarriage 30 onto the roofing membrane, for example as indicated, at a helical spring 58. The helical spring 58 permits height to be compensated for and the application of a vertical pressure from the pressing element 40 onto the roofing membrane or roof sheet 70 and furthermore onto the component 72, i.e. the metal plate illustrated in FIG. 13. If the pressing element 40 can be brought into contact with the roofing membrane 70 in a spring-mounted manner, a combination (not illustrated) of ball joint and helical spring would also be highly helpful since the parallelism and also the pressing would thereby be ensured.

The lowering or, put better, the contact between the pressing element 40 and the roofing membrane 70 and correspondingly the contact between the roofing membrane 70 and the component 72 or plate can indeed be brought about by a simple helical spring, such as the helical spring 54 or 58, but could also take place by means of a telescope or by a mechanical lever structure.

Figure 9:
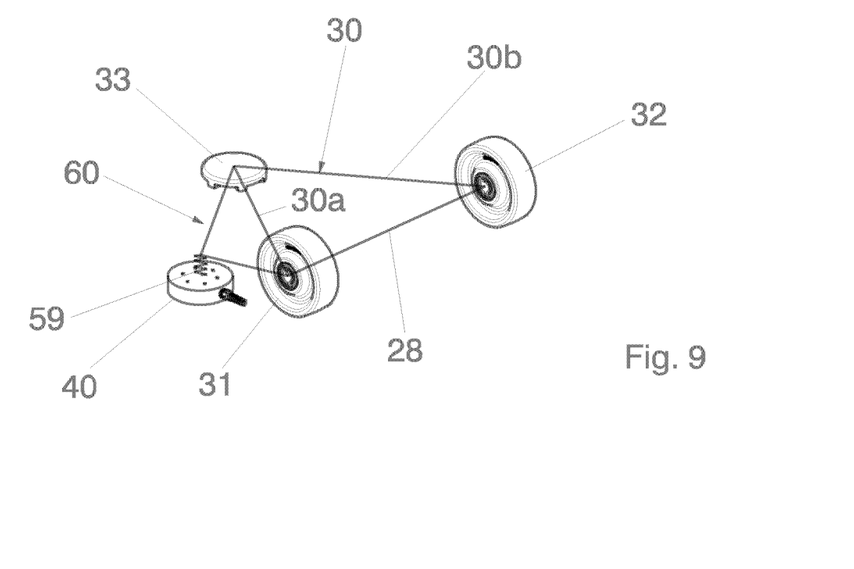
FIG. 9 shows a first variant of the fitting of the pressing element on the undercarriage according to FIG. 8.

FIG. 9 shows a first variant of the fitting of the pressing element 40 on the undercarriage 30 according to FIG. 8. The undercarriage 30, which in top view forms a triangle, in the corners of which the two castors 31, 32 and the sliding point 33 are arranged, is additionally provided with an extension arm structure 60 which is triangular in top view and at the free corner of which the pressing element 40 is suspended on a helical spring 59. In contrast to the arrangement according to FIG. 8, the pressing element 40 here is therefore fitted at a location outside the undercarriage 30 which is triangular in top view.

Figure 10:
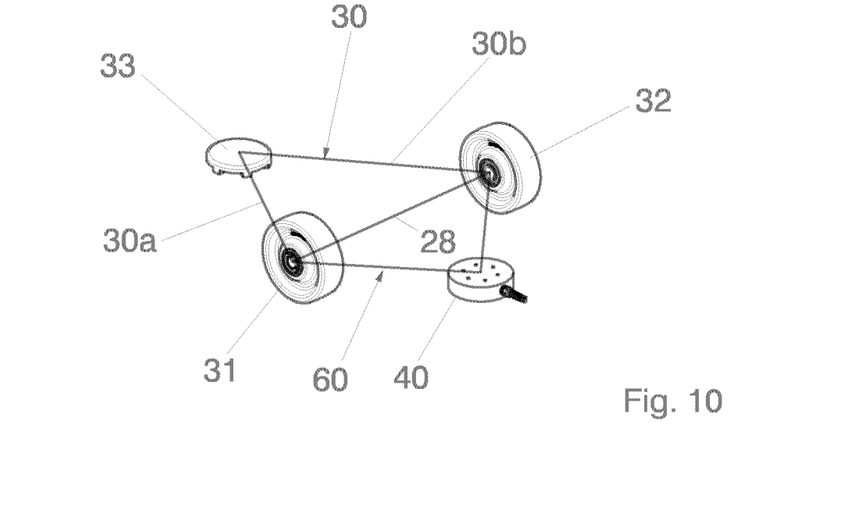
FIG. 10 shows a second variant of the fitting of the pressing element on the undercarriage according to FIG. 8.

FIG. 10 shows a second variant of the fitting of the pressing element 40 on the undercarriage 30 according to FIG. 8. In this case, the triangular extension arm structure 60, which, at the free corner thereof, bears the pressing element 40, is not coupled to the undercarriage 30 so as to be pivotable about the frame limb 30a, but rather so as to be pivotable about the axis 28. The frame 40 can thus be connected to the undercarriage 30 in such a manner that, when the device is tilted about the axis 28, the sliding point 33 is raised from the roofing membrane and the pressing element 40 remains on the roofing membrane or the pressing element 40 is raised from the roofing membrane and the sliding point 33 remains on the roofing membrane. In the situation in which the sliding point 33 is raised from the roofing membrane, the pressing element 40 is dragged along the roofing membrane during movement of the device. In the other situation, in which the pressing element 40 is raised from the roofing membrane, the sliding point 33 is dragged along the roofing membrane during movement of the device.

Figure 11:
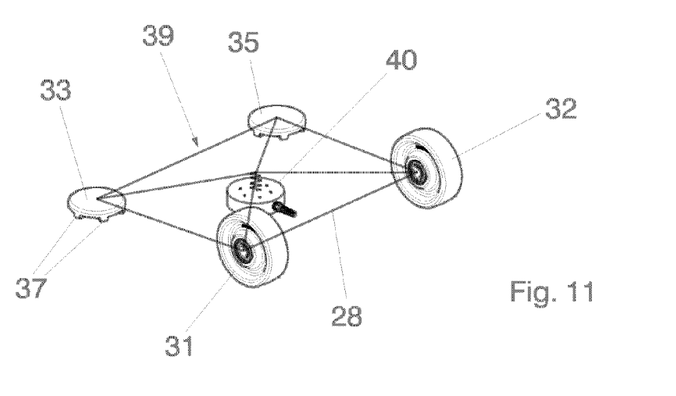
FIG. 11 shows, in a schematic illustration, an undercarriage which in top view forms a square, in the corners of which two castors and two sliding points are arranged, wherein the pressing element is fitted on the undercarriage at a location within the square.

FIG. 11 shows, in a schematic illustration, an undercarriage which is denoted overall by 39 and in top view forms a square, in the corners of which the two castors 31, 32 and two sliding points 33, 35 are arranged, wherein the pressing element 40 is fitted on the undercarriage 39 at a location within the square. As shown in FIG. 11, said location can be located at the intersecting point of the two diagonals of the square and therefore in the area center of gravity thereof. Although the manner of the fitting of the pressing element 40 on the undercarriage 39 is not shown, the fitting can take place, as already described above, by a helical spring, a ball joint, a joint head, a lever linkage or the like. Like the undercarriage 30, the undercarriage 39 is tiltable about the axis 28 by means of the frame 42 which is not shown in the schematic illustrations in FIGS. 5 to 11.

FIG. 12 shows, in a schematic illustration, a further preferred embodiment of a device 25 according to the invention, in which the undercarriage is designed as an extension arm 62 which is rigidly connected at one end (the left end in FIG. 12) to a frame 42 and is rigidly connected at an opposite end to a bracket 64. The device 25 is tiltable with the extension arm 62 about a castor and/or roller axis 29 which, at its free, other end bears the pressing element 40. The castor and/or roller axis 29 bears either the two castors 31 and 32 and/or, instead, a roller, such as the roller 26 shown in FIG. 12.

In the case of the above-described embodiments of the device 20, the sliding points 33, 35 are in each case designed as a supporting plate. The lower side of each supporting plate is provided with elevations 37 for spot-like contact in each case with a roofing membrane.

The construction of the frame 42 according to FIGS. 1-4 and the construction of the combination of the frame 42 and the bracket 64 according to FIG. 12, and also the distance A in which the housing 50 are arranged with the control and cooling device above the undercarriage 30 or above the extension arm 62 forming the undercarriage, are selected in such a manner that, when the device 20 or 25 is not tilted, the pressing element 40 presses onto a roofing membrane 70 (FIG. 13) with such a great force that any air gap between the lower side of the roofing membrane 70 and the upper side of a coating 74 of a plate or component 72 is eliminated and therefore a good adhesive bonding or welding result is always obtained. So that, after an adhesive bonding or welding operation, the device 21, 25 does not have to remain in the position which it has taken up in each case until the adhesive bonding or welding point has sufficiently hardened or solidified, the operator immediately tilts the device back into a moving position and moves on with the device to the next position in which the roofing membrane 70 is to be welded to a plate or component 72. So that the adhesive bonding or welding nevertheless has sufficient time for cooling and solidifying, as already outlined above, a magnet fastened to a separate rod is placed by the operator onto the roofing membrane 70 in the position in which said roofing membrane has just been adhesively bonded or welded to the plate or component 72 located therebelow.

FIG. 13 shows, partially in side view and partially in section, the use of the pressing element 40 during the welding of a roofing membrane 70 with a coating 74 to a component 72, which is a metal plate with which an insulating material layer 78 is fastened to a roof substructure 76. A flexible duct for a connecting cable (not illustrated) in the heating device 46 in the pressing element 40 is denoted in FIG. 13 by 80.

LIST OF DESIGNATIONS

20 device
21 contact point
22 contact point
23 contact point
24 contact line
25 device 26 roller
28 castor axis
29 roller and/or castor axis
30 undercarriage
30a frame limb
30b frame limb
31 castor
32 castor
33 sliding point
34 crosspiece
35 sliding point
36 triggering pedal
37 elevations
39 undercarriage
40 pressing element
41 frame
43 frame
44 handle
46 heating device
48 aluminum plate
50 housing
52 cooling back
54 helical spring
56 ball joint
58 helical spring
59 helical spring
60 extension arm structure
62 extension arm
64 bracket
70 roofing membrane
72 component
74 coating
76 roof substructure
78 insulating material layer
80 cable duct
A distance

The invention claimed is:

1. A unitary device for adhesively bonding or welding a roofing membrane (70), on a roof, the device comprising:
an undercarriage (30, 39) that supports the device (20; 25) on the roofing membrane (70) at a contact point (23), a pressing element (40) connected to the undercarriage for pressing the roofing membrane (70) onto a component (72) to be adhesively bonded or to be welded thereto, and a castor (31, 32) or roller (26) located at a further contact point (21, 22) or contact line (24) for moving the device (20, 25),
a controllable electric heating device that brings the roofing membrane (70) and the component (72) into an adhesively bondable or weldable state, and
a frame (42) which extends upward from the undercarriage (30, 39) to maneuver the device (20, 25),
wherein the pressing element (40) includes the heating device (46) which comprises an induction coil and is adapted to heat a metal plate which forms the component (72) and is provided with an adhesively bondable or weldable covering,
an induction generator and a control and cooling device therefor are fitted in or on a housing (50) which is fitted on the frame (42) at a distance (A) above the undercarriage (30, 39), and
wherein the device (20) is tiltable with the frame (42, 43) about a castor or roller axis (28, 29) and is movable in the tilted state.

2. The device as claimed in claim 1, wherein the pressing element (40) is movable one-dimensionally or multi-dimensionally in relation to the undercarriage (30, 39) by a joint head.

3. The device as claimed in claim 1, wherein the pressing element (40) is provided with compensation elements which ensure that the pressing element (40) rests uniformly on the roofing membrane (70).

4. The device as claimed in claim 1, wherein the pressing element (40) is movable into contact with the roofing membrane (70) in a spring-mounted manner.

5. The device as claimed in claim 1, wherein the pressing element (40) is lowerable with the undercarriage (30, 39) onto the roofing membrane (70).

6. The device as claimed in claim 1, wherein at least one of the contact points is designed as a sliding point (33), and the pressing element (40) is designed to be lowerable onto the roofing membrane (70) from the undercarriage (30, 39).

7. The device as claimed in claim 6, wherein the undercarriage (30, 39) in a top view forms a triangle, in corners of which two of the castors (31, 32) and the pressing element (40) are arranged.

8. The device as claimed in claim 6, wherein the undercarriage (30, 39) in a top view forms a triangle, in corners of which two of the castors (31, 32) and the sliding point (33) are arranged.

9. The device as claimed in claim 6, wherein the undercarriage (39) in a top view forms a square, in corners of which two of the castors (31, 32) and two of the sliding points (33, 35) are arranged.

10. The device as claimed in claim 8, wherein the pressing element (40) is fitted on the undercarriage (30) at a location within the triangle.

11. The device as claimed in claim 8, wherein the pressing element (40) is fitted on the undercarriage (30) at a location outside the triangle.

12. The device as claimed in claim 9, wherein the pressing element (40) is fitted on the undercarriage (39) at a location within the square.

13. The device as claimed in claim 5, wherein the undercarriage is designed as an extension arm (62) which is pivotable at one end with the frame (42) about the castor or roller axis (28, 29) and bears the pressing element (40) at its free, other end.

14. The device as claimed in claim 13, wherein the castor or roller axis (28, 29) bears at least one castor (31) or at least one roller (26).

15. The device as claimed in claim 6, wherein the sliding point (30, 35) is designed as a supporting plate.

16. The device as claimed in claim 15, wherein a lower side of the supporting plate is provided with elevations (37) for contact in spots or regions with a roofing membrane (70).

17. The device as claimed in claim 1, wherein the induction coil is combined with a position exploring coil.

* * * * *